United States Patent [19]
Hori et al.

[11] Patent Number: 5,161,148
[45] Date of Patent: Nov. 3, 1992

[54] OPTICAL PICK-UP USING WAVELENGTH GUIDE WITH GRATING COUPLER THEREIN

[75] Inventors: Yoshikazu Hori, Osaka; Hiroaki Yamamoto, Neyagawa; Fumihiro Sogawa, Osaka, all of Japan

[73] Assignee: Matsushita Electric Industrial Co., Ltd., Osaka, Japan

[21] Appl. No.: 487,964

[22] Filed: Aug. 1, 1989

[30] Foreign Application Priority Data

Aug. 5, 1988 [JP] Japan .................................. 63-196556
Aug. 5, 1988 [JP] Japan .................................. 63-196557

[51] Int. Cl.$^5$ .................................................. G11B 7/00
[52] U.S. Cl. ..................................... 369/112; 369/44.23; 369/118; 369/122
[58] Field of Search ............... 369/44.12, 44.37, 44.38, 369/44.23, 112, 120, 121, 122, 44.24, 118; 350/99.11–99.18, 162.21; 169/112

[56] References Cited

U.S. PATENT DOCUMENTS 4,779,259 10/1988 Kono et al. ........................ 369/112
4,797,867 1/1989 Sunagawa ........................ 369/112 X

FOREIGN PATENT DOCUMENTS

| 0222238 | 5/1987 | European Pat. Off. | 369/112 |
| 0258890 | 9/1988 | European Pat. Off. | 369/44.12 |
| 8706386 | 10/1987 | France | 369/112 |
| 0157738 | 8/1985 | Japan | 369/112 |
| 0139146 | 6/1987 | Japan | 369/44.12 |
| 0259848 | 10/1988 | Japan | 369/112 |
| 2-46536 | 2/1990 | Japan | 369/112 |

Primary Examiner—Roy N. Envall, Jr.
Assistant Examiner—Nabil Hindi
Attorney, Agent, or Firm—Wenderoth, Lind & Ponack

[57] ABSTRACT

An optical pick-up for an optical disk has a semiconductor laser having an optical axis for generating a laser beam. An objective lens focuses the laser beam onto an optical disk disposed in the path of the optical axis of the semiconductor laser. A wavelength between the semiconductor laser and the objective lens has a plurality of input grating couplers for coupling the laser beam reflected from the optical disk into the waveguide for propagating beams in a plurality of directions. A plurality of output grating couplers radiate the propagated beams from the waveguide. A plurality of photodetectors detect the radiated beams from the output grating couplers.

6 Claims, 6 Drawing Sheets

OPTICAL PICK-UP USING WAVELENGTH GUIDE WITH GRATING COUPLER THEREIN

BACKGROUND OF THE INVENTION

This invention relates to optical pick-ups used for recording and/or reading signals in optical disk systems.

A conventional optical pick-up for optical recording systems comprises a semiconductor laser, an optical lens for focusing the laser beam emitted from the semiconductor laser on to the optical disk, a beam splitter for splitting and guiding the reflected laser beam from the surface of the optical disk to photodetectors, a cylindrical lens for giving an astigmatism in the wavefront of the reflected beam to generate focusing error signals, and photodetectors for detecting focusing and tracking error signals and for detecting information signals stored in the optical disk.

Since the conventional optical pick-up for optical disk system comprises a plurality of small-sized optical components, the total size and weight are not sufficiently small to realize a thin and compact disk system. Also, the optical axes arrangements for all small-size optical components are very difficult, and thus the production cost becomes very expensive. Hence, optical pick-ups, in which some plurality of optical components are integrated into one monolithic or hydrid units, are proposed in order to realize a small-sized and light optical pickup system and to simplify the fabrication processes thereof. For example, an integrated thin film optical pick-up, which integrates the beam splitter photodetectors and lens on a silicon substrate was proposed by Ura et al. An holographic optical pick-up, in which the beam splitter and cylindrical lens are functionally integrated into a hologram has been developed by Kimura et al. And an optical pick-up with waveguide detectors in which beam splitters and photodetectors are integrated on the waveguide, fabricated on a transparent glass substrate, was proposed by Sagawa et al.

However, these proposed optical pick-ups have the following serious problems. The main problems in the integrated thin film optical pick-up are its low power utilization efficiency of the laser, and the poor focusing properties of the waveguide lens. Namely, the coupling efficiency between a laser diode and a waveguide which integrates a focusing lens and a beam splitter and photodetectors is less than 10%, and the coupling efficiency of the waveguide lens from guided mode to radiation optical mode should be kept less than 10%, and thus an optical laser power utilized to read information stored on a disk is limited. The focusing properties of the grating lens are very sensitive to the wavelength of the semiconductor laser, and the positional deviation from the design between the laser and the grating lens, and therefore focused spot size, is enlarged and several spots appear due to the wavelength shift or the multimode oscillation of the laser diode owing to the optical reflection. The big problem in the holographic pick-up, which is the second example, is the limitation of the size of the integrated device and the fine adjustment of the photodetectors and hologram with respect to the semiconductor laser in the integrated device. A sufficiently long distance, about 5 mm between the semiconductor laser and the hologram, is required because the photodetectors should be placed apart from the semiconductor laser about 1 mm. The photodetectors should be placed at an accurate position in order to obtain the focusing error and tracking error signals. The problem in the third example of the optical-up is the limited speed of the photodetectors. The photodetectors should be fabricated as an amorphous silicon, therefore the speed is limited due to the low electron mobility.

SUMMARY OF THE INVENTION

This invention is to overcome the above problems in the conventional optical pick-ups.

The optical pick-up in this invention comprises an integrated device having a semiconductor laser, and waveguide with grating coupler for guiding the reflected optical beam from the optical disk into the waveguide and for radiating the guided optical beam into the photodetectors, which are placed near the semiconductor laser, and the focusing lens.

With the optical pick-up in this invention it is possible to include a concave lens to expand the laser beam for reducing the length between the semiconductor laser and the focusing lens in the integrated device.

While the novel features of the invention are set forth with particularity in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
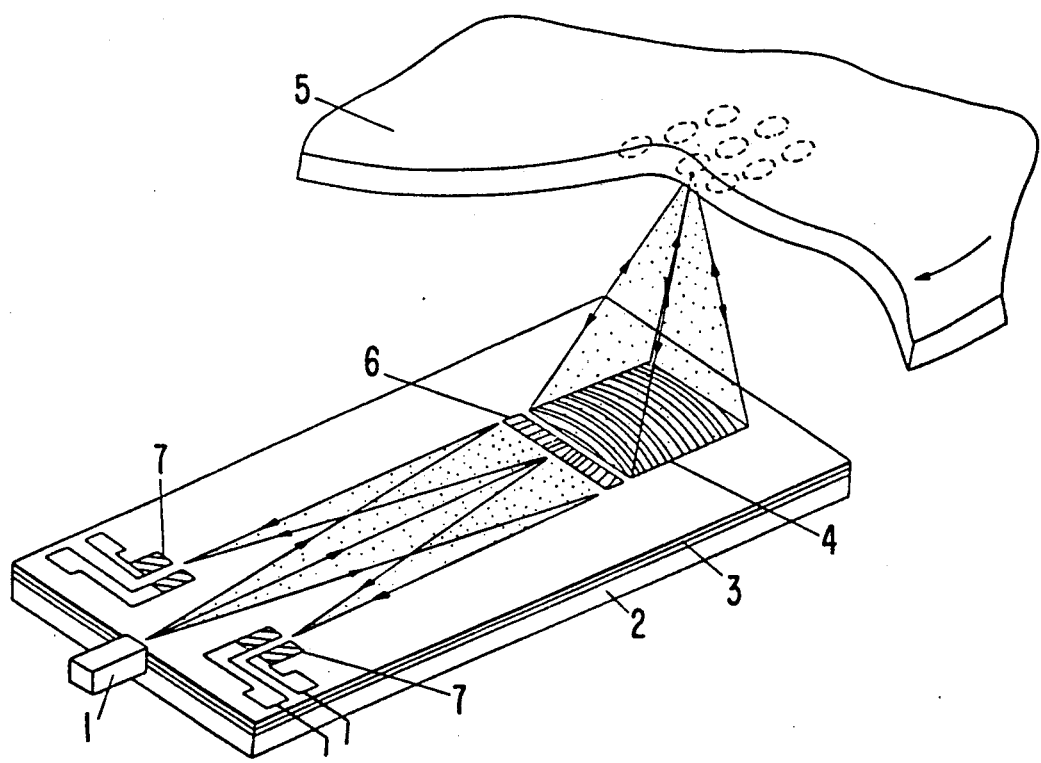
FIG. 1 is a schematic perspective view showing an integrated optical pick-up which was proposed prior to this invention which has a hybrid structure of a laser diode and an optical integrated circuit.

In order to realize a very small optical pickup, an optical integrated pickup which integrates a semiconductor laser, a beam splitter, photodetectors and lens was proposed by Ura et al. The schematic structures of the integrated optical pick-up is shown in FIG. 1. The optical beam emitted from the semiconductor laser 1 couples and propagates in a waveguide 3 fabricated on the silicon substrate 2, and then focuses on the optical disk 5 by a focusing grating coupler 4 fabricated on the surface of the waveguide 3. The reflected and expanding beam, with modulated intensity according to the recorded information signals reaches the focusing grating coupler 4, and is coupled to the waveguide again. A part of the guided beam returns to the semiconductor laser, and the other part of the laser beam is split by a beam splitter 6 and divided into two parts and focused on two pairs of photodetectors 7, which are also fabricated on the silicon substrate 2. The focusing error is detected by the double knife edge method and the tracking error is detected by the push pull method according to the signals detected in the two pairs of the photodetectors.

Figure 2:
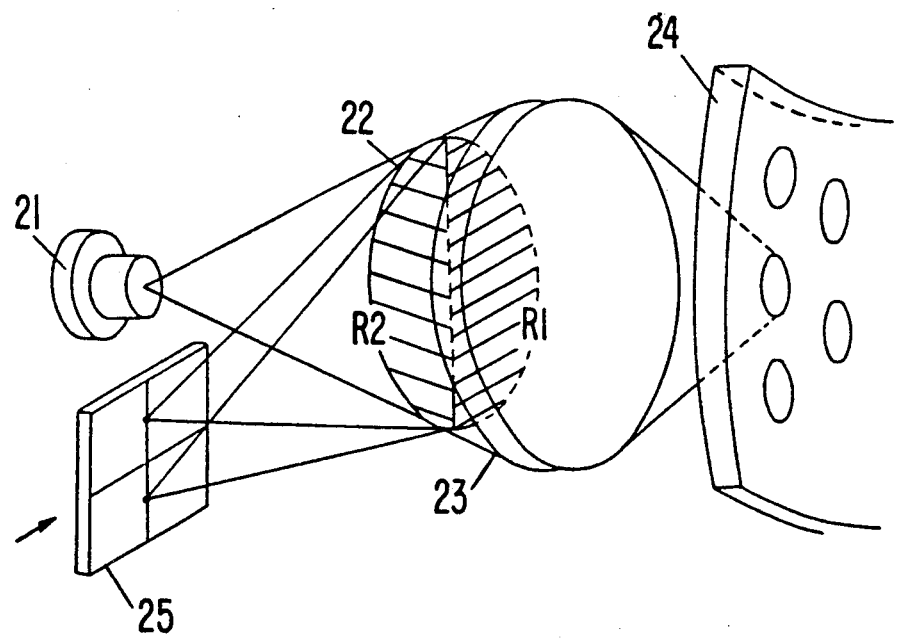
FIG. 2 is a schematic perspective view showing a holographic optical pick-up which was proposed prior to this invention which has a hybrid structure of a laser diode, focusing lens, hologram and photodetectors.

A small size optical pick-up, a holographic type pick-up, has been developed by Kimura et al. The schematic structure of the holographic optical pick-up is shown in FIG. 2. An optical beam is emitted from a semiconductor laser 21 and focused on the surface of an optical disk 24 through a focusing lens 23. A part of the optical beam reflected from the surface of the optical disk returns to the semiconductor laser 21 through the focusing lens 23. The other part of the beam is divided into two by two regions of a hologram 22, denoted as R1 and R2, and focused on the quandrant photodetectors and then the tracking signals and focusing errors are detected based on the double knife edge method and the push-pull method, respectively. Also, the RF signal, which is the formation signal recorded in the disk, is detected as the sum of the current of the photodetectors 25.

Figure 3A:
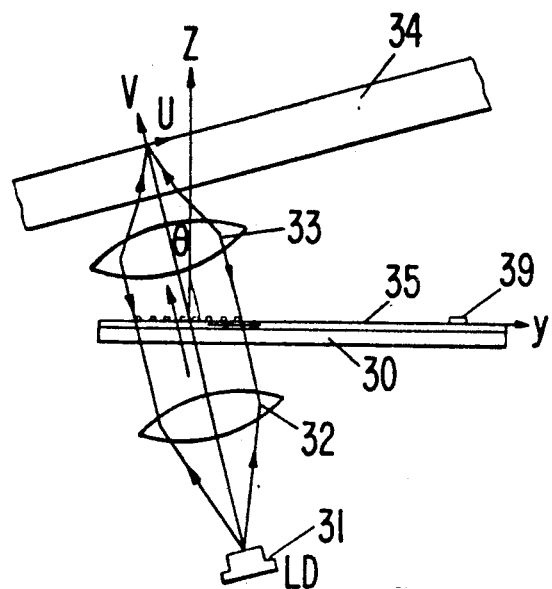
FIG. 3(a) and FIG. 3(b) is a schematic perspective view showing an optical pick-up which was proposed prior to this invention which has a hybrid structure of a laser diode focusing and collimation lens and integrated circuit.
Figure 3B:
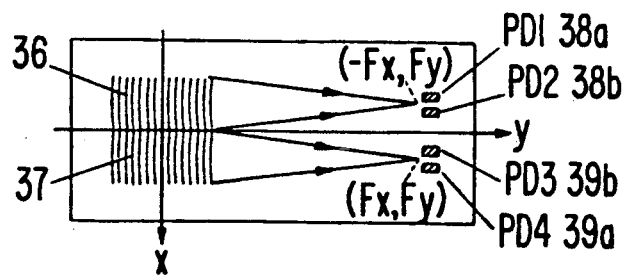

Another type of an optical pick-up with waveguide detectors is proposed by Sagawa et al., in which optical pick-up a holograpic device and photodetectors are integrated on the waveguide on a transparent substrate. The schematic optical pick-up is shown in FIG. 3. An optical beam emitted from a semiconductor laser 31 is focused on the surface of an optical disk 34 by a collimation lens 32 and a focusing lens 33. The reflected beam from the surface of the optical disk is coupled into an optical waveguide 35 on a glass substrate 30 by a grating coupler 36 and 37 and lead to two pairs of the photodetectors 38(a), and 38(b), 39(a) and 39(b). The signal detection method is same as those explained in the previous embodiments.

However, these proposed optical pick-ups have the following problems. In the first example of the conventional integrated thin film optical pick-up, extremely precise and accurate fabrication technology is required for fabricating the focusing grating coupler, because if small discrepanices exist between the design and the actual relative position between the semiconductor laser and the focusing grating coupler, sufficient focusing properties will not be obtained. The change of the oscillation wavelength of the semiconductor laser will degrade the focusing properties. Moreover, the utilization efficiency of the laser beam is very bad, because the coupling efficiency between the laser and waveguide is limited to less than 10%, and also the diffraction efficiency of the focusing grating coupler or grating lens should be suppressed to less than about 10% for realizing a small spot size on the disk.

In the second example of the conventional optical-pickup, the position of the hologram and the photodetectors should be very accurate with respect to the position of the semiconductor laser in order to obtain the focusing and tracking error signals. And the hologram should be placed apart from the laser in order to place the photo detectors apart from the semiconductor laser, and therefore the realization of a small size is difficult.

In the third example of the conventional optical-up, since the photodetectors are fabricated on the surface of a glass substrate, high speed detection of up to several MHz required for signal detection is difficult. For example, if amorphous silicon, which is generally used, is used as photodetector materials, the frequency is limited to less than several hundred Kbit/s.

This invention is made to solve the above-stated problems. The invention is now explained with reference to FIGS. 4-7.

Figure 4:
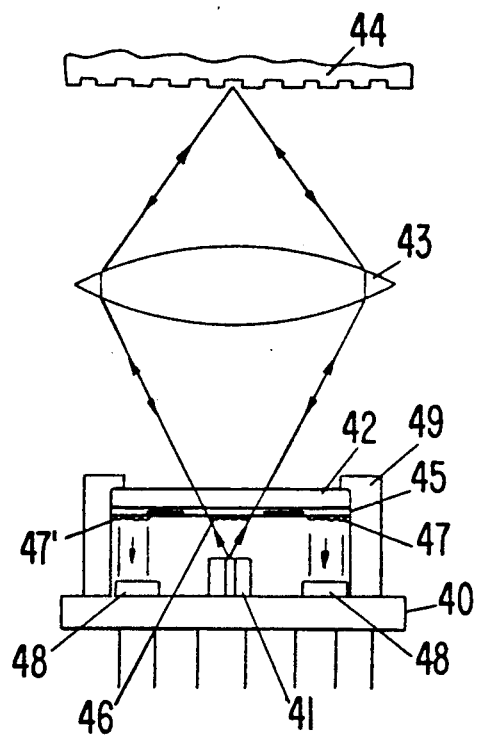
FIG. 4 is a perspective view showing an optical pickup comprising a focusing lens and an integrated device with a semiconductor laser, photodetectors and waveguide according to the invention.

The first embodiment of the invention is shown in FIG. 4 and provides an optical pick-up having a size of the integrated device which is very small. A waveguide 45 has two kinds of grating couplers, one of which is for coupling the reflected beam into the waveguide, and the other which is for leading the guided beam into the photodetectors placed beside the semiconductor laser.

A laser beam emitted from a semiconductor laser 41 is focused by a focusing lens 43 on to the surface of an optical disk 44. The reflected and expanding beam from the disk is focused by the focusing lens 43 and returns in the direction of the semiconductor laser 41. In this process a part of the optical beam couples into a waveguide 45 fabricated on a glass substrate 42 through an input grating coupler 46. The propogated guided beam is radiated into the air by an output grating coupler 47 and lead to photo detectors 48. The semiconductor laser 41, photodetectors 48 and glass substrate 42 with waveguides 45 and grating couplers 46, 47 are integrated into one device using a package cap 49 and a mount 40.

Figure 5:
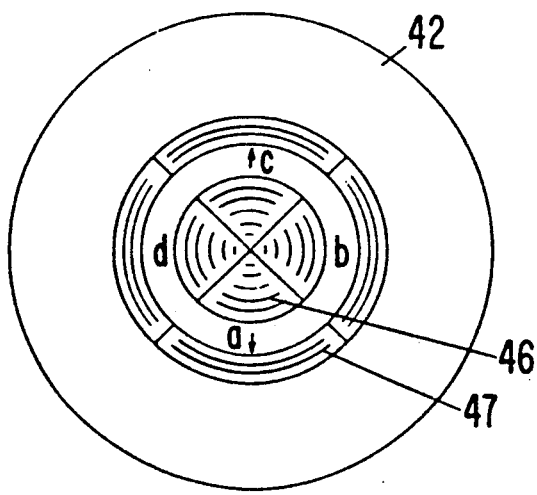
FIG. 5 is a schematic pattern of couplers used in the invention.

The grating pattern of the input and output grating couplers 46 and 47 couplers are shown in FIG. 5. The input grating coupler is a type of focusing grating coupler, and only a optical beam emitted from a specific point is coupled into the optical waveguide through the focusing lens device. The input grating couplers 46(a), (b), (c) and (d) are integrated on the waveguide 45 fabricated on the glass substrate 42 by the deposition of silicon nitride. Here, (a) and (c) are designed for coupling with the beam emitted from the points of f+f1 and (b) and (d) are for f−f1. f corresponds to the distance between the focusing lens and the optical disk in the case of just focus, which means that optical beam from the semiconductor laser is just focused on the disk. f1 is a small values of several microns. The guided beam input from 46(a), (b), (c), (d) is output by output grating coupler 47(a), (b), (c), (d), respectively, and the intensity of the guided wave are detected by the corresponding four photodetectors 48(a), (b), (c), (d) in FIG. 4. In the case of just focus, the coupling efficiencies of through the grating couplers (a), (b) (c) and (d) is same. However, if the distance between the lens and the disk is deviated from f the coupling efficiencies will vary and then the current in the photodetectors varies. For example, the coupling efficiencies of (a) and (c) is larger than those of (b) and (d) in the case that the distance between the focusing lens and the disk is larger than f. Therefore the difference of the coupling efficiencies will give the focusing error signals. The patterns of the output couplers are parallel and the beam coupled by the input grating coupler and propagated through the waveguide is radiated in the direction of the photodetectors. Tracking error signals are detected by the differences of the sum of the photo current of the detectors (a) and (c), and the sum of (c) and (d), based on the push-pull method. Since the photodetectors need not be accurately placed near the laser, the positional alignment allowance of the photodetectors, is large and therefore the fabrication is easy. Since the distance between the laser and waveguide is not limited as the conventional holographic optical pick-up, it is possible to realize a small-size optical pick-up.

Figure 6:
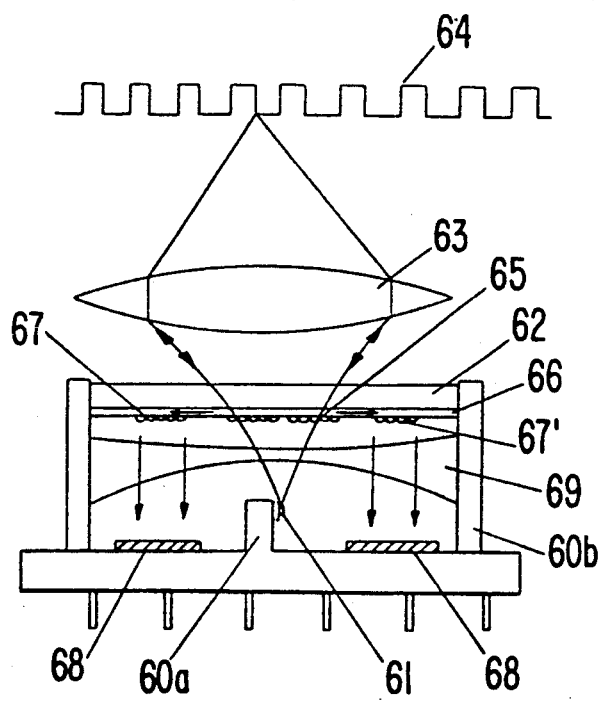
FIG. 6 is a perspective view showing an optical pickup comprising a focusing lens and an integrated device with a semiconductor laser, photodetectors, a waveguide and a concave lens according to the invention.

A second embodiment of the invention is shown in FIG. 6, for providing an optical pick-up having a size of the integrated device which is very small, by means of, concave lens and a waveguide with two kinds of grating couplers, one of which is an input grating coupler for coupling the reflected beam into the waveguide and other which is an output grating coupling for leading the guided beam into photodetectors placed beside the semiconductor laser.

A laser beam emitted from a semiconductor laser 61 is once expanded by a concave lens 69 and then focused by a focusing lens 63 on to the surface of an optical disk 64. The reflected and expanding beam from the disk is focused by the focusing lens 63 and returns toward the semiconductor laser 61. In this process a part of the optical beam couples into a waveguide 66 fabricated on a substrate 62 by an input grating coupler 65. The propagated beam is radiated into the air by an output grating coupler 67 and lead to photo detectors 68. The semiconductor laser, photodetectors, concave lens and waveguides are integrated into one device by a packaging cap 60(b) and a mount 60(a).

The grating pattern of the input and output grating couplers is almost same as the pattern used in the first embodiment shown in FIG. 5. Also, the focusing error detection method is the same. In this embodiment, the semiconductor laser, photodetectors, hologram and the concave lens are integrated into one device. In this embodiment, the distance between the focusing lens and semiconductor lens is very small, and therefore further reduction of the size of the optical pickup is possible.

Figure 7:
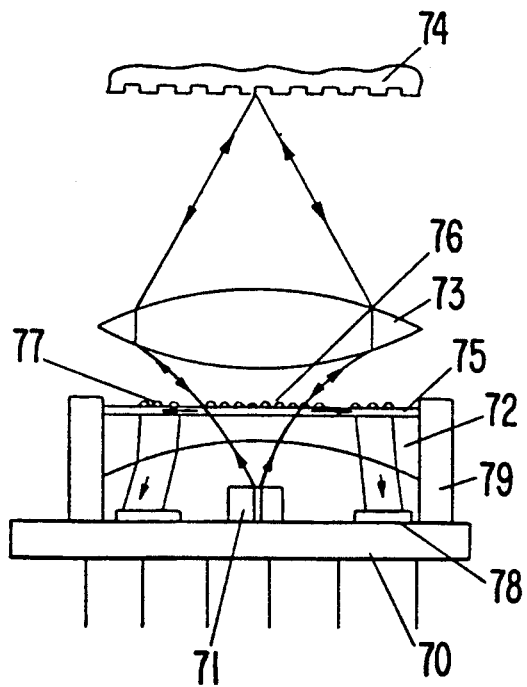
FIG. 7 is a perspective view showing an optical pickup comprising a focusing lens and an integrated device with a semiconductor laser, photodetectors, and a waveguide fabricated on the surface of a concave lens according to the invention.

The third embodiment of the invention is shown in FIG. 7 for providing an optical pick-up having a size of the integrated device which is very small, by means of a waveguide 75 with two kinds of grating couplers, one of which is an input grating coupler for coupling a reflected beam into the waveguide and the other which is an output grating coupler for leading the guided beam into photodetectors placed beside a semiconductor laser.

A laser beam emitted from a semiconductor laser 71 expanded by a concave lens 72 and then focused by a focusing lens 73 on to the surface of an optical disk 74. The reflected and expanding beam from the disk is focused by the focusing lens 73 and returns toward the semiconductor laser 71. In this process a part of the optical beam couples into the waveguide 75 fabricated on the surface of a concave lens 72 through an input grating coupler 76, and the propagated beam is radiated into the air by an output grating coupler 77 and lead to photo detectors 78. The semiconductor laser, photodetectors and waveguides are integrated into one device with a package cap 79 and a mount 70.

The grating pattern of the input and output grating couplers is almost same as the one used in the first embodiment shown in FIG. 5. Also, the focusing error detection method is the same. In this embodiment, the waveguide 75 is fabricated on the surface of the concave lens 72. In this embodiment the distance between the focusing lens and semiconductor lens is very small, and therefore further reduction of the size of the optical pickup is possible.

While specific embodiments of the invention have been illustrated and described herein, it is realize that modifications and changes will occur to those skilled in the art. It is therefore to be understood that the appended claims are intended to cover all modifications and changes as fall within the true spirit and scope of the invention.

We claim:

1. An optical pick up, comprising:
an objective lens for focusing a laser beam onto an optical disk; and
a single assembly integrated device, comprising a single package having therein:
a mount,
a semiconductor lase on said mount for emitting a laser beam to the objective lens,
a waveguide having plural input grating couplers in the center of said waveguide and plural output grating couplers located radially of said input grating couplers in said waveguide, said waveguide being located so as to surround the optical axis of the laser beam and placed above said semiconductor laser, wherein said plural input grating couplers couple the laser beam reflected from a disk into said waveguide and propagate beams to said plural output grating couplers in a direction perpendicular to the optical axis of said semiconductor laser, and said plural output grating couplers radiate the propagated beams therefrom, and
photodetectors located an said mount adjacent to said semiconductor laser, said photodetectors detecting the radiated beams from said output grating couplers.

2. The optical pick-up of claim 1, wherein
a package cap is connected to said mount, said waveguide being mounted on said package cap spaced from said photodetectors and said semiconductor laser.

3. The optical pick-up of claim 2, wherein:
a concave lens for expanding the laser beam generated by said semiconductor laser is mounted on said package cap between said waveguide and said photodetectors and said semiconductor laser.

4. The optical pick-up of claim 3, wherein:
said waveguide is formed and disposed on said concave lens.

5. The optical pick-up of claim 1, wherein said single assembly integrated device further comprises a concave lens between said semiconductor laser and said waveguide, said concave lens extending the laser beam emitted from said semiconductor laser.

6. The optical pick-up of claim 5, wherein said waveguide is on the surface of said concave lens.

* * * * *